(12) United States Patent
Yugo et al.

(10) Patent No.: US 6,784,642 B2
(45) Date of Patent: Aug. 31, 2004

(54) POWER SUPPLY HAVING TEMPERATURE SENSORS FOR DETECTING BATTERY TEMPERATURES

(75) Inventors: Masaki Yugo, Kakogawa (JP); Naohiro Shigeta, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/323,689

(22) Filed: Dec. 20, 2002

(65) Prior Publication Data

US 2003/0122527 A1 Jul. 3, 2003

(30) Foreign Application Priority Data

Dec. 27, 2001 (JP) ........................................ 2001-396457

(51) Int. Cl.[7] .............................................. H01M 10/46
(52) U.S. Cl. ...................................................... 320/150
(58) Field of Search .............................. 320/107, 127, 320/134, 136, 150, 162

(56) References Cited

U.S. PATENT DOCUMENTS 6,563,290 B2 * 5/2003 Sakakibara et al. ......... 320/106
6,566,843 B2 * 5/2003 Takano et al. .............. 320/114
6,577,105 B1 * 6/2003 Iwaizono ..................... 320/134

FOREIGN PATENT DOCUMENTS

| JP | 10-270094 | 10/1998 |
| JP | 2001-052763 | 2/2001 |

* cited by examiner

*Primary Examiner*—Edward H. Tso
(74) *Attorney, Agent, or Firm*—Wenderoth, Lind & Ponack, L.L.P.

(57) ABSTRACT

A power supply is provided with a plurality of secondary batteries, a voltage detection circuit for detecting voltages of the respective secondary batteries or voltages of a plurality of battery modules each of which is a series connection of secondary batteries, and temperature sensors for detecting temperatures of secondary batteries. Each of the temperature sensors has a temperature characteristic that its electric resistance is small when the temperature of an associated secondary battery is low and increases as the temperature of the associated secondary battery increases past a setting temperature. The voltage detection circuit detects the voltages of the respective secondary batteries or the voltages of the respective battery modules as well as battery temperatures by using the temperature sensors as parts of lead wires for detection of the voltages.

17 Claims, 4 Drawing Sheets

POWER SUPPLY HAVING TEMPERATURE SENSORS FOR DETECTING BATTERY TEMPERATURES

This application is based on Application No. 396457 filed in Japan on Dec. 27, 2001, the content of which is incorporated hereinto by reference.

BACKGROUND OF THE INVENTION

The present invention relates to a power supply that is mainly used for driving a motor of an electromotive vehicle such as a hybrid car or an electric car and that is provided with a circuit for detecting a battery temperature.

Power supplies that are used for moving an electromotive vehicle are charged and discharged with a large current to obtain a large output power, and hence the battery temperature may become high during their use. Power supplies that are mounted on vehicles are subjected to a large variation in temperature environment such as a very low temperature in severe winter and a very high temperature in hot summer. Secondary batteries tend deteriorate in performance when used at a very high temperature. When the battery temperature has risen to an abnormally high temperature, further temperature increase can be prevented by stopping charging and discharging or by forcible cooling. For this purpose, power supplies are provided with a temperature detection circuit.

Power supplies provided with a temperature detection circuit are disclosed in JP-A-10-270094 and 2001-52763, for example. In the power supplies that are disclosed in these publications, temperature sensors are fixed to the surface of a battery module. The battery module is a series connection of a plurality of secondary batteries. Temperature sensors are fixed to the surfaces of the respective secondary batteries and are connected to each other in series. The series connection of the temperature sensors is connected to a temperature detection circuit. Each temperature sensor is a device such as the PTC whose electric resistance increases steeply as the battery temperature increases past a setting temperature. Therefore, the electric resistance of the series connection of the temperature sensors increases as the battery temperature increases past the setting temperature. Whether the temperature of the battery module has become higher than the setting temperature can be detected on the basis of the electric resistance of the series connection of the temperature sensors.

In the above power supplies, the series connection of the temperature sensors that are fixed to the respective batteries needs to be connected to the temperature detection circuit by lead wires. Further, it is necessary to control the charging and discharging while detecting the voltage of the battery module. Therefore, in the power supplies of this type, the wiring for the detection of the battery temperature and the wiring for the detection of the battery voltage need to be provided separately. As such, a power supply incorporating a lot of batteries has a disadvantage that such wiring is very complicated. Further, a high voltage may develop across the wiring for detection of the battery voltage. This means a problem that possible short-circuiting in that wiring causes a large current to flow through the batteries, resulting in a dangerous situation.

The present invention has been made in view of the above problems, and an important object of the invention is therefore to provide a power supply capable of simplifying wiring for detection of a battery temperature and a battery voltage.

Another important object of the invention is to provide a power supply capable of increasing the safety by limiting, with temperature sensors, a current that flows when wiring for detection of a battery voltage is short-circuited.

SUMMARY OF THE INVENTION

A power supply according to the invention comprises a plurality of secondary batteries, a voltage detection circuit for detecting voltages of the respective secondary batteries or voltages of a plurality of battery modules each of which is a series connection of secondary batteries, and temperature sensors for detecting temperatures of secondary batteries. Each of the temperature sensors has a temperature characteristic that its electric resistance is small when the temperature of an associated secondary battery is low and increases as the temperature of the associated secondary battery increases past a setting temperature. The voltage detection circuit detects the voltages of the respective secondary batteries or the voltages of the respective battery modules as well as battery temperatures by using the temperature sensors as parts of lead wires for detection of the voltages.

The power supply having the above configuration has an advantage that wiring for detection of the battery temperatures and the battery voltages can be simplified. This is because the temperature sensors for detecting the temperatures of secondary batteries are used as parts of lead wires for detection of the voltages of the respective secondary batteries or battery modules and the voltage detection circuit detects the voltages of the respective secondary batteries or battery modules as well as battery temperatures. Since the temperature sensors for detecting the temperatures of secondary batteries are used as parts of lead wires for detection of the voltages, it is not necessary to separately provide wiring for detection of the battery temperatures and wiring for detection of the battery voltages and hence the wiring can be simplified. Therefore, the manufacturing cost of even a power supply incorporating a lot of batteries can be reduced by virtue of simplified wiring. This power supply has another advantage of increased safety. That is, since a current that flows when wiring for detection of a battery voltage is short-circuited can be limited by temperature sensors, a dangerous situation as would otherwise be caused by a large current flowing through the batteries can be prevented effectively.

The voltage detection circuit may detect the battery temperatures on the basis of detection voltages obtained by using the temperature sensors as parts of the lead wires.

The power supply may be such that the plurality of battery modules are arranged parallel with each other, and that a plurality of temperature sensors that are attached to a surface of at least one battery module and connected to each other in series constitute each of temperature detection units that is connected to an associated battery module to serve as a lead wire for detection of a voltage of the associated battery module.

Each of the temperature detection units may be a series connection of a plurality of temperature sensors that are attached to surfaces of two adjoining battery modules that are arranged parallel with each other or a series connection of a plurality of temperature sensors that are attached to a surface of a single battery module.

The power supply may be such that it further comprises bus bars that connect, to each other in series, the battery modules that are arranged parallel with each other, and one end of each of the temperature detection units are connected to the bus bars.

The power supply may be such that it further comprises an absolute temperature detection circuit and absolute temperature sensors that are connected to the absolute temperature detection circuit and attached to surfaces of secondary batteries, and the absolute temperature detection circuit and the absolute temperature sensors detect battery temperatures.

The power supply may be such that a series connection of an absolute temperature sensor and temperature sensors that are attached to a surface of a battery module forms each of second temperature detection units, and that the second temperature detection units are connected to the absolute temperature detection circuit, the temperature detection units are connected to the voltage detection circuit, and both of the absolute temperature detection circuit and the voltage detection circuit detect battery temperatures. Further, the power supply may be such that a temperature detection unit is attached to one of two adjoining battery modules and a second temperature detection unit is attached to the other battery module, whereby temperatures of the two adjoining battery modules are detected.

The above and further objects and features of the invention will more fully be apparent from the following detailed description with accompanying drawings.

DETAILED DESCRIPTION OF THE INVENTION

Figure 1:
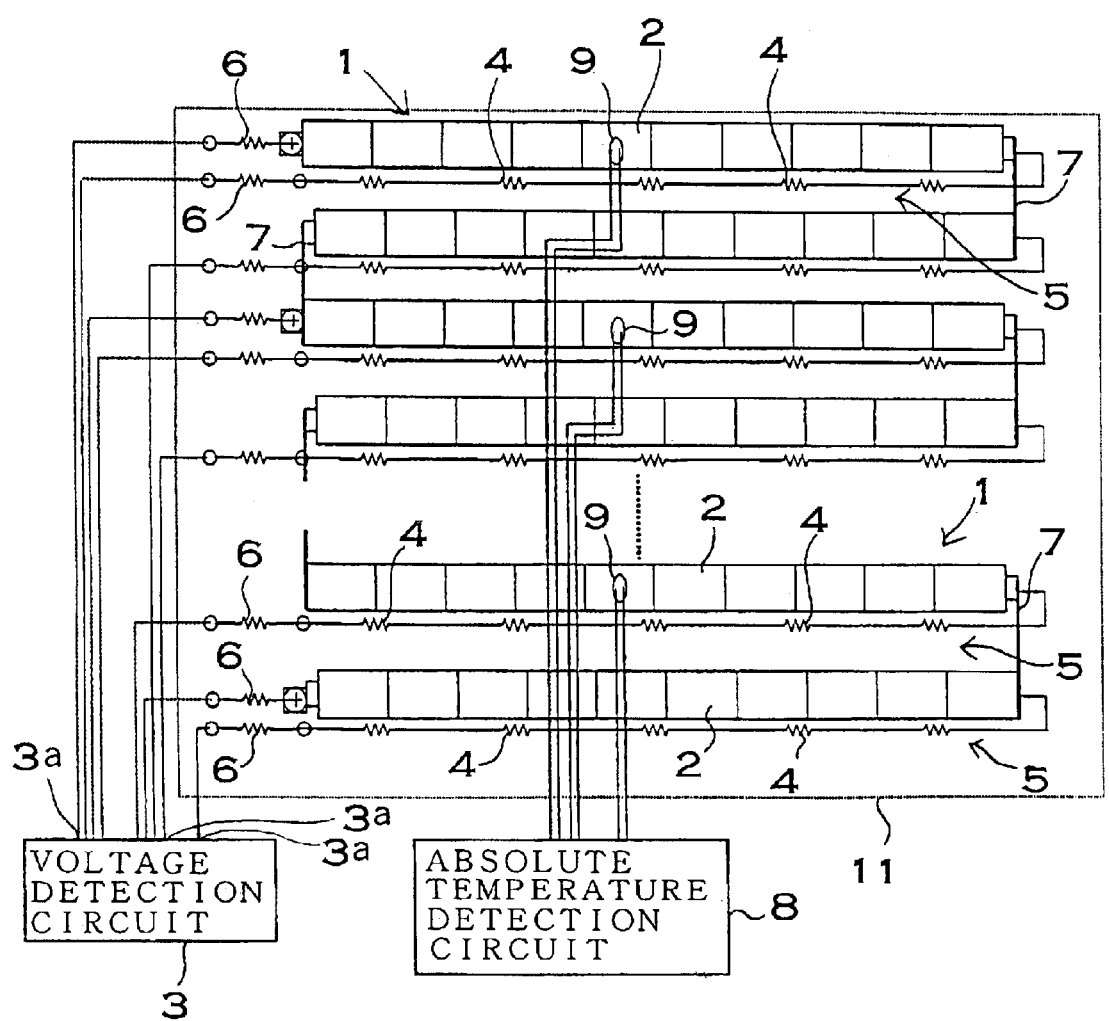
FIG. 1 schematically shows the configuration of a power supply according to one embodiment of the present invention.
Figure 2:
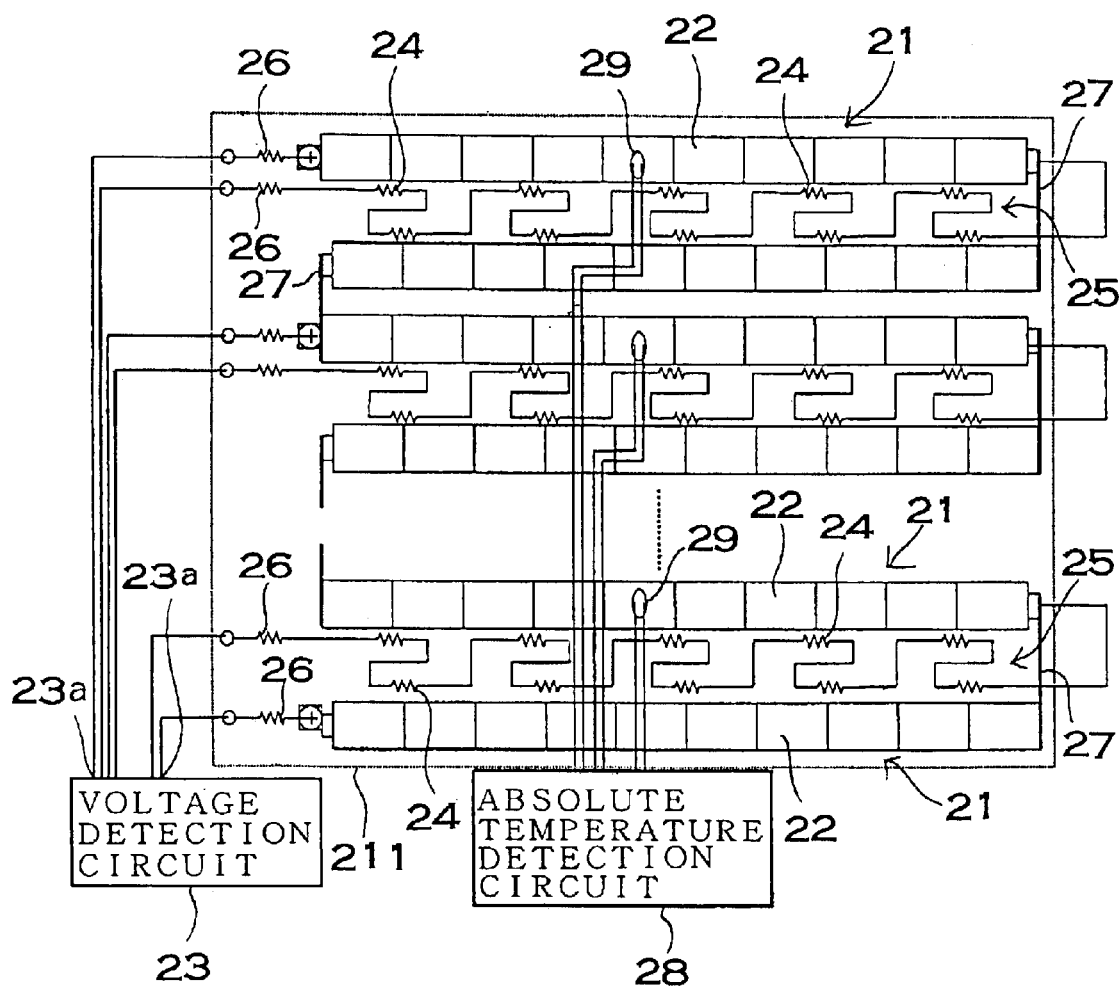
FIG. 2 schematically shows the configuration of a power supply according to another embodiment of the invention.
Figure 3:
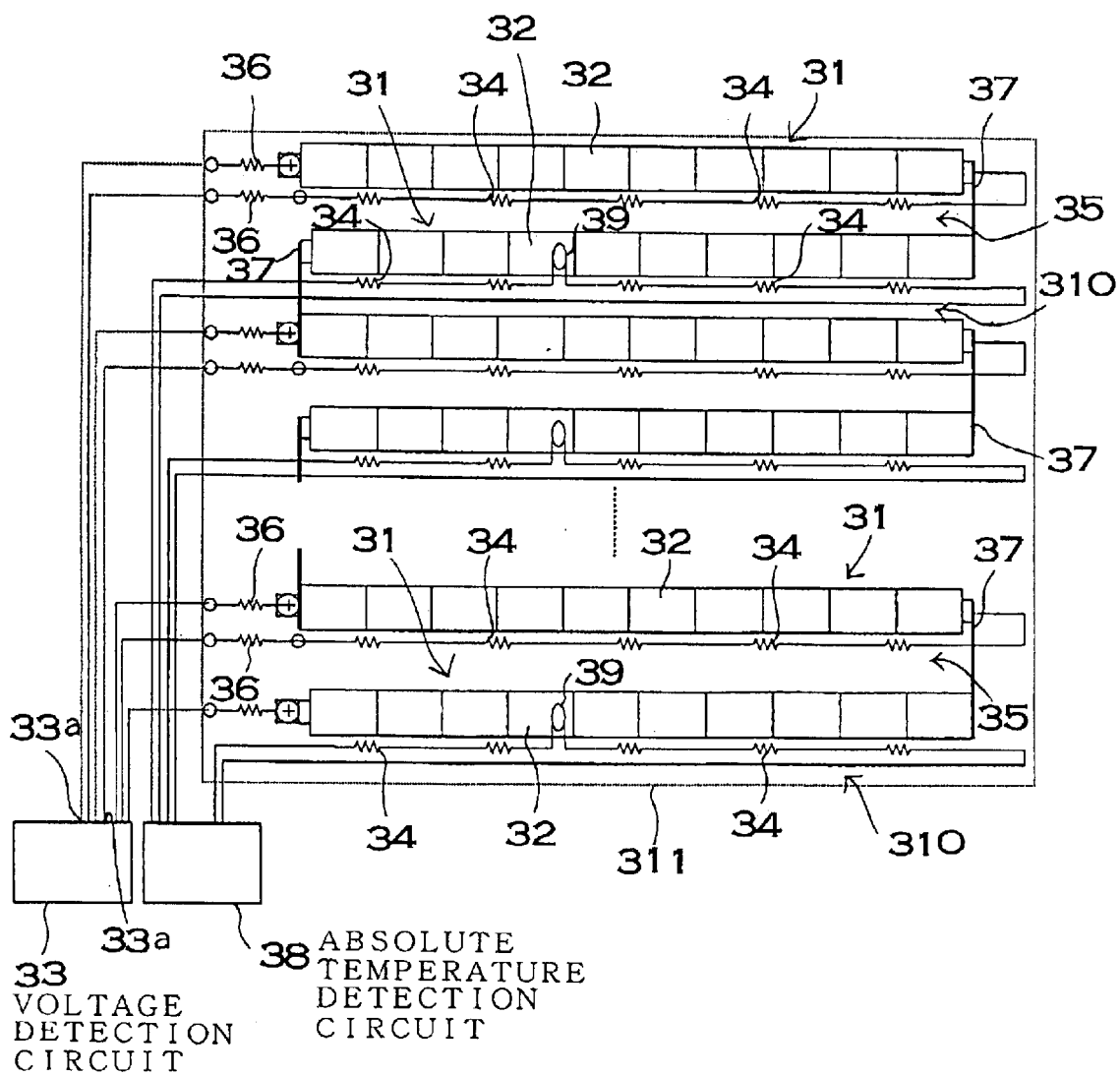
FIG. 3 schematically shows the configuration of a power supply according to a further embodiment of the invention.

Power supplies shown in FIGS. 1–3 are provided with a plurality of secondary batteries 2, 22, or 32 that are incorporated in a case 11, 211, or 311, a voltage detection circuit 3, 23, or 33 for detecting the voltages of a plurality of battery modules 1, 21, or 31, and temperature sensors 4, 24, or 34 for detecting battery temperatures. The voltage detection circuit 3, 23, or 33 shown in FIGS. 1–3 detects the voltages of the battery modules 1, 21, or 31 rather than the voltages of the respective secondary batteries 2, 22, or 32. However, according to the invention, a power supply can be constructed so as to detect individual battery temperatures with a voltage detection circuit. Each temperature sensor 4, 24, or 34 has a temperature characteristic that its electric resistance is small when the battery temperature is low and increases as the battery temperature increases past a setting or predetermined temperature. The PTC is most suitable for the temperature sensors 4, 24, or 34. Since its electric resistance increases steeply as the battery temperature increases past a setting temperature, the PTC has a feature that it can correctly detect that the battery temperature has exceeded the setting temperature. However, devices other than the PTC may be used for the temperature sensors 4, 24, or 34.

The voltage detection circuit 3, 23, or 33 detects not only the voltages of the battery modules 1, 21, or 31 but also the battery temperatures via the temperature sensors 4, 24, or 34. The voltage detection circuit 3, 23, or 33 detects the battery temperatures by detecting the voltages of the battery modules 1, 21, or 31 or by detecting currents flowing through input terminals 3a, 23a, or 33a. To detect each voltage or current, the voltage detection circuit 3, 23, or 33 has a pair of input terminals 3a, 23a, or 33a. One input terminal 3a, 23a, or 33a is connected to one end of the associated battery module 1, 21, or 31. The other input terminal 3a, 23a, or 33a is connected to the other end of the associated battery module 1, 21, or 31 via the temperature sensors 4, 24, or 34.

Figure 4:
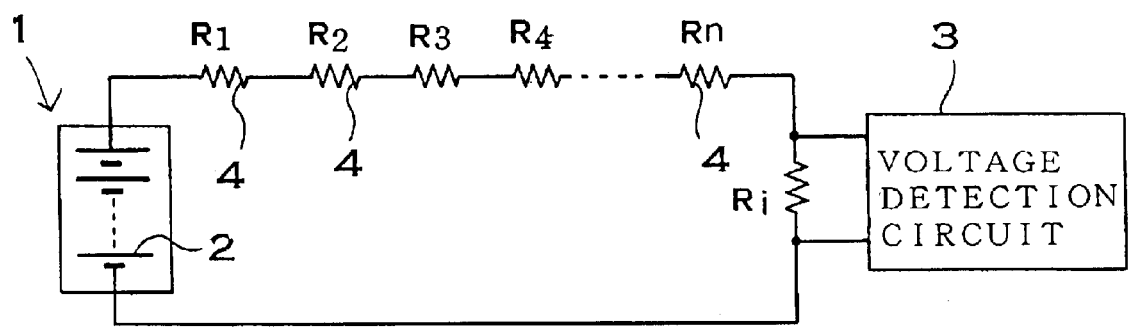
FIG. 4 is a circuit diagram showing how a voltage detection circuit detects a battery voltage and the electric resistance of temperature sensors.

FIG. 4 is a circuit diagram showing how the voltage detection circuit 3 detects the battery voltage and the electric resistance of the temperature sensors 4. The input resistance $R_i$ of the voltage detection circuit 3 shown in FIG. 4 is sufficiently greater than electric resistances $R_1, R_2, \ldots, R_n$ of the PTCs as the temperature sensors 4 when the battery temperature is lower than the setting temperature. In other words, the electric resistances $R_1, R_2, \ldots, R_n$ of the temperature sensors 4 are sufficiently smaller than the input resistance $R_i$ of the voltage detection circuit 3. Therefore, the voltage detection circuit 3 detects the battery voltage disregarding voltage drops across the respective temperature sensors 4. That is, the electric resistances $R_1, R_2, \ldots, R_n$ of the temperature sensors 4 do not lower the detection voltage that is detected at the input terminals 3a of the voltage detection circuit 3. Therefore, when the battery temperature is lower than the setting temperature, the voltage detection circuit 3 can correctly detect the voltage of the battery module 1 via the temperature sensors 4.

When the battery temperature becomes higher than the setting temperature, the electric resistances $R_1, R_2, \ldots, R_n$ of the PTCs as the temperature sensors 4 increase significantly. In this state, the electric resistances $R_1, R_2, \ldots, R_n$ of the PTCs as the temperature sensors 4 are greater than the input resistance $R_1$ of the voltage detection circuit 3 or are no longer sufficiently smaller than the latter. Therefore, voltage drops occur in the PTCs as the temperature sensors 4 whose electric resistance $R_1, R_2, \ldots, R_n$ are large. The voltage drops of the temperature sensors 4 lower the detection voltage at the input terminals 3a of the voltage detection circuit 3 for detecting the voltage of the battery module 1. As a result, the detection voltage of the voltage detection circuit 3 is decreased when the battery temperature is higher than the setting temperature.

The electric resistances $R_1, R_2, \ldots, R_n$ of the PTCs as the temperature sensors 4 are very large when the battery temperature is higher than the setting temperature. Therefore, the voltage at the input terminals 3a of the voltage detection circuit 3 is much lower than the voltage of the battery module 1. Detecting that the detection voltage is significantly small, the voltage detection circuit 3 judges that the battery temperature has become higher than the setting temperature.

However, the detection voltage of the voltage detection circuit 3 is also decreased when the voltage of the battery module 1 is low. Therefore, when the detection voltage of the voltage detection circuit 3 has decreased, it is necessary to judge whether the voltage of the battery module 1 has decreased or the battery temperature has increased. This can be done on the basis of the degree of decrease in detection voltage, because the decrease in detection voltage when the battery temperature has become higher than the setting temperature can be made larger than that when the voltage of the battery module 1 has decreased. When the battery temperature becomes higher than the setting temperature, the electric resistances $R_1, R_2, \ldots, R_n$ of the PTCs as the temperature sensors 4 increase markedly and hence the input voltage of the voltage detection circuit 3 decreases significantly. On the other hand, the input voltage of the voltage detection circuit 3 does not decrease so significantly. Consequently, if the detection voltage of the voltage detection circuit 3 has decreased only slightly, it can be judged that the voltage of the battery module 1 is being detected. If the detection voltage of the voltage detection circuit 3 has decreased significantly, it can be judged that the battery temperature has become higher than the setting temperature.

In the power supplies of FIGS. 1–3, a temperature detection unit 5, 25, or 35 that is a series connection of a plurality of temperature sensors 4, 24, or 34 is fixed to the surface of each of the battery modules 1, 21, or 31 that are housed in the case 11, 211, or 311 so as to be arranged parallel with each other. In the temperature detection units 5, 25, or 35 shown in FIGS. 1–3, one temperature sensor 4, 24, or 34 is provided for every two secondary batteries 2, 22, or 32. In the power supplies of FIGS. 1–3, each battery module 1, 21, or 31 has a series connection of 10 secondary batteries 2, 22, or 32. Therefore, in the temperature detection units 5, 25, or 35, five temperature sensors 4, 24, or 34 are provided for each battery module 1, 21, or 31. Each temperature sensor 4, 24, or 34 is fixed to the boundary portion of two adjoining secondary batteries 2, 22, or 32; each temperature sensor 4, 24, or 34 serves to detect the temperature of two secondary batteries 2, 22, or 32. The structure that the plurality of temperature sensors 4, 24, or 34 are arranged in this manner provides an advantage that the temperatures of all the secondary batteries 2, 22, and 32 can be detected while the number of temperature sensors 4, 24, or 34 is made equal to a half of the number of secondary batteries 2, 22, and 32. The number of temperature sensors may be either greater than or smaller than a half of the number of secondary batteries. Temperature sensors that are provided in a number that is smaller than a half of the number of secondary batteries detect the temperatures of particular secondary batteries. It is preferable that temperature sensors that are provided in a number that is greater than a half of the number of secondary batteries be arranged so as to be able to detect the temperatures of all the secondary batteries.

In the power supply of FIG. 1, one temperature detection unit 5 is provided for each battery module 1. Each temperature detection unit 5 is a series connection of a plurality of temperature sensors 4 that are attached to the surface of one battery module 1. In the power supply of FIG. 2, one temperature detection unit 25 is provided for every two battery modules 21. Each temperature detection unit 25 is a series connection of a plurality of temperature sensors 24 that are alternately attached to the surfaces of two adjoining battery modules 21 that are arranged parallel with each other. This temperature detection unit 25 has an advantage that the plurality of temperature sensors 24 that are attached to the two adjoining battery modules 21 can be connected to each other with a shortest wiring length.

Connected to the associated battery module 1, 21, or 31, each temperature detection unit 5, 25, or 35 also serves as a lead wire for detection of the voltage of the associated battery module 1, 21, or 31. More specifically, one end of each temperature detection unit 5, 25, or 35 is connected to one end of the associated battery module 1, 21, or 31 and the other end of the former is connected to an input terminal 3a, 23a, or 33a of the voltage detection circuit 3, 23, or 33. In the power supplies of FIGS. 1–3, the battery modules 1, 21, or 31 that are arranged parallel with each other are connected to each other in series by means of bus bars 7, 27, or 37. And one end of each of the temperature detection units 5, 25, and 35 are connected to the bus bars 7, 27, or 37. Further, in the power supplies of FIGS. 1–3, the battery modules 1, 21, or 31 and the temperature detection units 5, 25, or 35 are connected to the input terminals 3a, 23a, or 33a of the voltage detection circuit 3, 23, or 33 via protective resistors 6, 26, or 36. The protective resistors 6, 26, or 36 prevent flow of a large current when short-circuiting occurs in the circuits that connect the temperature detection units 5, 25, or 35. The protective resistors 6, 26, or 36 have a resistance value that can limit a short-circuiting current and that is sufficiently smaller than the input resistance of the voltage detection circuit 3, 23, or 33 and hence allows correct detection of the voltages of the battery modules 1, 21, or 31. However, the protective resistors 6, 26, or 36 are not always necessary; the temperature detection units 5, 25, or 35 and the battery modules 1, 21, or 31 may be connected directly to the voltage detection circuit 3, 23, or 33.

The power supplies of FIGS. 1–3 are also provided with an absolute temperature detection circuit 8, 28, or 38 and absolute temperature sensors 9, 29, or 39 that are connected to the absolute temperature detection circuit 8, 28, or 38 and detect the temperatures of secondary batteries 2, 22, or 32. The absolute temperature sensors 9, 29, or 39 are attached to the surfaces of secondary batteries 2, 22, or 32 detect their temperatures. In the power supplies of FIGS. 1–3, the battery temperatures are detected by both of the temperature detection circuit that consists of the absolute temperature sensors 9, 29, or 39 and the absolute temperature detection circuit 8, 28, or 38 and the circuit that consists of the temperature sensors 4, 24, or 34 and the voltage detection circuit 3, 23, or 33. Each absolute temperature sensor 9, 29, or 39 is a device such as a thermistor whose electric resistance varies with the temperature. Although both of the absolute temperature sensor 9, 29, or 39 and the temperature sensor 4, 24, or 34 are devices for detecting battery temperature, they are different from each other in the manner of detecting the temperature. The absolute temperature sensor 9, 29, or 39 is a device for detecting the absolute temperature of a battery correctly, such as a device for detecting the temperature of a battery in °C. In contrast, the temperature sensor 4, 24, or 34 is a device for detecting whether the battery temperature is higher than a setting temperature, that is, a device for detecting a relative temperature with respect to the setting temperature.

The power supply of FIG. 3 is provided with second temperature detection units 310 each of which is a series connection of an absolute temperature sensor 39 and temperature sensors 34 all of which are attached to the surface of the associated battery module 31. The second temperature detection units 310 are connected to the absolute temperature detection circuit 38. In this power supply, the temperatures of the battery modules 31 are detected by both of the temperature detection units 35 and the second temperature detection units 310. The temperatures of two adjoining battery modules 31 are detected by a temperature detection unit 35 that is provided for one of the adjoining battery modules 31 and a second temperature detection unit 310 that is provided for the other battery module 31. This power supply can detect whether the temperature of a certain battery module 31 has become higher than the setting temperature by detecting the battery temperatures by means of the voltage detection circuit 33 and the absolute temperature detection circuit 38.

By detecting the electric resistance of each second temperature detection unit 310, the absolute temperature detection circuit 38 detects both of the absolute temperature and the relative temperature of the associated batteries. The electric resistance of the temperature sensor 34 is sufficiently smaller than that of the absolute temperature sensor 39 when the batter temperature is lower than the setting temperature.

Therefore, if the electric resistances of the second temperature detection units 310 are small, the absolute temperature detection circuit 38 detects the absolute temperatures of the batteries through the electric resistances of the absolute temperature sensors 39. When the battery temperature becomes higher than the setting temperature, the electric resistance of the temperature sensor 34 increases steeply to become much higher than that of the absolute temperature sensor 39. Therefore, if the electric resistances of the second temperature detection units 310 are large, the absolute temperature detection circuit 38 judges that the battery temperature is higher than the setting temperature.

The absolute temperature sensor 39 and the temperature sensor 34 have different electric resistances when the battery temperature is low; when the battery temperature is low, the electric resistance of the PTC as the temperature sensor 34 is sufficiently smaller than that of the absolute temperature sensor 39. Therefore, when the battery temperature is lower than the setting temperature, the absolute temperature detection circuit 38 can accurately detect the temperatures of the respective battery modules 31 by detecting the electric resistances of the respective second temperature detection units 310.

To detect the voltages of the plurality of battery modules 1, 21, or 31, the power supplies of FIGS. 1-3 are provided with the voltage detection circuit 3, 23, or 33 for detecting the voltages of the respective battery modules 1, 21, or 31 and the absolute temperature detection circuit 8, 28, or 38. Alternatively, a switching circuit is provided on the input side of the voltage detection circuit 3, 23, or 33 and the voltages of the respective battery modules 1, 21, or 31 and the electrical resistances of the second temperature detection units 310 are detected sequentially.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power supply comprising:
    a plurality of secondary batteries;
    a voltage detection circuit for detecting voltages of the respective secondary batteries or voltages of a plurality of battery modules each of which is a series connection of a plurality of the secondary batteries; and
    temperature sensors for detecting temperatures of the secondary batteries,
    wherein each of the temperature sensors has a temperature characteristic that its electric resistance is small when a temperature of an associated secondary battery is low and increases as the temperature of the associated secondary battery increases past a setting temperature; and
    wherein the voltage detection circuit detects the voltages of the respective secondary batteries or the voltages of the respective battery modules as well as battery temperatures by using the temperature sensors as parts of lead wires for detection of the voltages.

2. The power supply according to claim 1, wherein the plurality of battery modules are arranged parallel with each other, and wherein each of a plurality of the temperature sensors that are attached to a surface of at least one battery module, and are connected to each other in series, constitute a temperature detection unit that is connected to the at least one battery module to serve as a lead wire for detection of a voltage of the the at least one battery module.

3. The power supply according to claim 2, wherein each of the temperature detection units is a series connection of a plurality of temperature sensors that are attached to surfaces of two adjoining battery modules that are arranged parallel with each other.

4. The power supply according to claim 2, wherein each of the temperature detection units is a series connection of a plurality of temperature sensors that are attached to a surface of a single battery module.

5. The power supply according to claim 2, further comprising bus bars that connect, to each other in series, the battery modules that are arranged parallel with each other, wherein one end of each of the temperature detection units is connected to the bus bars.

6. The power supply according to claim 1, further comprising:
    an absolute temperature detection circuit; and
    absolute temperature sensors that are connected to the absolute temperature detection circuit and are attached to surfaces of the secondary batteries,
    wherein the absolute temperature detection circuit and the absolute temperature sensors detect battery temperatures.

7. The power supply according to claim 6, wherein a series connection of the absolute temperature sensor and temperature sensors that are attached to a surface of at least one of the battery modules forms a second temperature detection unit, and wherein the second temperature detection unit is connected to the absolute temperature detection circuit and the absolute temperature detection circuit detects battery temperatures.

8. The power supply according to claim 6, wherein:
    the plurality of battery modules are arranged parallel with each other;
    first temperature sensors that are attached to a surface of at least one of the battery modules, and are connected to each other in series, each constitute a first temperature detection unit that is connected to an associated battery module;
    a series connection of an absolute temperature sensor and a plurality of second temperature sensors that are attached to a surface of a battery module forms a second temperature detection unit; and
    each of the second temperature detection units is connected to the absolute temperature detection circuit, each of the first temperature detection units is connected to the voltage detection circuit, and both of the absolute temperature detection circuit and the voltage detection circuit detect battery temperatures.

9. The power supply according claim 8, wherein at least one of the first temperature detection units is attached to one of two adjoining battery modules and at least one of the second temperature detection units is attached to the other of the two adjoining battery modules, whereby temperatures of the two adjoining battery modules are detected.

10. The power supply according to claim 2, further comprising protective resistors each of which connects one of the battery modules or one of the temperature detection units to the voltage detection circuit.

11. The power supply according to claim 1, wherein each of the temperature sensors is a PTC.

12. The power supply according to claim 6, wherein each of the absolute temperature sensors is a thermistor.

13. The power supply according to claim 1, wherein an input resistance of the voltage detection circuit is sufficiently larger than an electric resistance of each of the temperature sensors when a temperature of an associated secondary battery is lower than the setting temperature.

14. The power supply according to claim 13, wherein each of the temperature sensors is a PTC.

15. The power supply according to claim 1, wherein each of the temperature sensors is fixed to a boundary portion of two adjoining secondary batteries to detect a temperature of the two adjoining secondary batteries.

16. A power supply comprising:

a plurality of battery modules, wherein each of the battery modules includes a plurality of secondary batteries connected in series;

a voltage detection circuit for detecting voltages of the battery modules; and a plurality of temperature detection units, wherein each of the temperature detection units is connected to a surface of at least one of the battery modules and includes a plurality of temperature sensors, connected in series, for detecting temperatures of the secondary batteries, each of the temperature detection units comprises a first end and a second end, wherein the first end is connected to an end of an associated battery module and the second end is connected to an input terminal of the voltage detection circuit, and thus each of the temperature detection units functions as a lead wire for detection of the voltage of the associated battery module;

wherein each of the temperature sensors has a temperature characteristic that its electric resistance is small when a temperature of an associated one of the secondary batteries is low and increases as the temperature of the associated secondary battery exceeds a predetermined temperature, and wherein the voltage detection circuit is operable to detect the voltages of the secondary batteries or the voltages of the battery modules as well as temperatures of the secondary batteries.

17. The power supply according to claim 16, wherein the voltage detection circuit comprises a plurality of pairs of input terminals, wherein each of the pairs of input terminals includes a first input terminal connected to one end of an associated one of the battery modules, and a second input terminal connected to the other end of the associated battery module via one of the temperature detection units.

* * * * *